US012519716B2

(12) United States Patent
Azvine et al.

(10) Patent No.: US 12,519,716 B2
(45) Date of Patent: *Jan. 6, 2026

(54) METHODS AND SYSTEMS OF OPERATING SOFTWARE-DEFINED NETWORKS

(71) Applicant: BRITISH TELECOMMUNICATIONS PUBLIC LIMITED COMPANY, London (GB)

(72) Inventors: Behnam Azvine, London (GB); Ali Sajjad, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/696,089

(22) PCT Filed: Aug. 23, 2022

(86) PCT No.: PCT/EP2022/073496
§ 371 (c)(1),
(2) Date: Mar. 27, 2024

(87) PCT Pub. No.: WO2023/052005
PCT Pub. Date: Jun. 4, 2023

(65) Prior Publication Data
US 2025/0133015 A1    Apr. 24, 2025

(30) Foreign Application Priority Data

Sep. 29, 2021  (GB) .................................. 2113951

(51) Int. Cl.
*H04L 45/302*    (2022.01)
*H04L 9/40*      (2022.01)
*H04L 41/40*     (2022.01)

(52) U.S. Cl.
CPC .......... *H04L 45/306* (2013.01); *H04L 45/308* (2013.01); *H04L 63/20* (2013.01); *H04L 41/40* (2022.05)

(58) Field of Classification Search
CPC ..... H04L 45/306; H04L 45/308; H04L 41/40; H04L 63/20
See application file for complete search history.

(56) References Cited

U.S. PATENT DOCUMENTS 9,038,151 B1      5/2015  Chua
10,153,940 B2 *  12/2018  Anand .................... H04L 47/32
(Continued)

FOREIGN PATENT DOCUMENTS

CN    110881023 A      3/2020
CN    117999767 A  *   5/2024 ............. H04L 41/06
(Continued)

OTHER PUBLICATIONS

Notice of Completion of Formalities for Patent Registration dated Oct. 16, 2024, issued for Chinese Application No. 202280064966.4 (3 pages).
(Continued)

*Primary Examiner* — James R Sheleheda
(74) *Attorney, Agent, or Firm* — Nixon & Vanderhye P.C.

(57) ABSTRACT

An aspect of the disclosure relates to a computer-implemented method of operating a software-defined network, the method comprising: initialising a plurality of paths through a data plane for traffic associated with a category of applications and/or services; selecting one of the plurality of paths to be an initial operational path; routing traffic associated with the category of applications and/or services via the initial operational path; subsequently obtaining data indicating that a trigger event has occurred; and responsive thereto: selecting a different one of the plurality of paths to
(Continued)

be a replacement operational path; and routing traffic associated with the category of applications and/or services via the replacement operational path. Further aspects relate to a data processing system, a computer program, a computer-readable data carrier, and a data carrier signal.

16 Claims, 5 Drawing Sheets

(56) References Cited

U.S. PATENT DOCUMENTS

| | | | | |
|---|---|---|---|---|
| 12,278,826 | B2* | 4/2025 | Azvine | H04L 63/1416 |
| 2010/0146299 | A1* | 6/2010 | Swaminathan | G06F 21/6227 707/E17.014 |
| 2016/0211988 | A1* | 7/2016 | Lucas | H04L 45/302 |
| 2018/0084006 | A1* | 3/2018 | Kwan | H04L 63/0227 |
| 2018/0331945 | A1* | 11/2018 | Attarwala | H04L 45/302 |
| 2020/0099625 | A1* | 3/2020 | Yigit | H04L 45/22 |
| 2020/0374215 | A1* | 11/2020 | Shah | H04L 45/22 |
| 2024/0275802 | A1* | 8/2024 | Azvine | H04L 63/1441 |
| 2024/0283813 | A1* | 8/2024 | Ailabouni | H04L 63/1416 |
| 2024/0305560 | A1* | 9/2024 | Means | H04L 45/76 |
| 2024/0370535 | A1* | 11/2024 | Sheybani | G06F 21/16 |
| 2024/0430305 | A1* | 12/2024 | Kalapatapu | H04L 63/1425 |
| 2025/0133015 | A1* | 4/2025 | Azvine | H04L 45/302 |

FOREIGN PATENT DOCUMENTS

| | | | | |
|---|---|---|---|---|
| GB | 2611317 | A * | 4/2023 | H04L 63/20 |
| KR | 20170109949 | A | 10/2017 | |
| KR | 20190043105 | | 4/2019 | |
| KR | 102174421 | B1 | 11/2020 | |
| WO | 2017200978 | A1 | 11/2017 | |
| WO | WO-2023052005 | A1 * | 4/2023 | H04L 63/20 |
| WO | WO-2023052006 | A1 * | 4/2023 | H04L 41/06 |

OTHER PUBLICATIONS

First Notification of Office Action dated Jul. 31, 2024, issued for Chinese Application No. 202280064966.4 (7 pages).
International Preliminary Report on Patentability and Written Opinion of the International Searching Authority dated Apr. 11, 2024, issued for International Application No. PCT/EP2022/073506 (10 pages).
International Search Report for PCT/EP2022/073496 mailed Dec. 13, 2022, 5 pages.
Written Opinion of the ISA for PCT/EP2022/073496 mailed Dec. 13, 2022, 10 pages.
Written Opinion of the International Preliminary Examining Authority PCT/EP2022/073496 dated Aug. 30, 2023, 7 pages.
Combined Search and Examination Report for GB2113951.4 dated Jun. 27, 2022, 11 pages.
Combined Search and Examination Report for GB2113955.5 dated Jun. 30, 2022, 12 pages.
Examination Report for GB2113951.4 dated Jan. 30, 2023, 6 pages.
International Preliminary Report on Patentability for PCT/EP2022/073496 dated Dec. 11, 2023, 31 pages.
Nouha Samet, et al., "Adaptive encryption for real time mobile multimedia services", 13th International Wireless Communications and Mobile Computing Conference (IWCMC), Valencia, 2017, pp. 282-286, doi: 10.1109/IWCMC.2017.7986300.
Vijay Varadharajan et al., "A Policy based Security Architecture for Software Defined Networks", 2018, 2018 IEEE, vol. 14, No. 4, Apr. 2019, pp. 897-912.
Oh, Bong-Hwan Oh, "Priority based Flow Control for Dynamic and Reliable Flow Management in SDN", IEEE Transactions on Network and Service Management, vol. 15, 2018, pp. 1720-1732 Sections I-III.
Kallol Krishna Karmakar et al., "Towards a Dynamic Policy Enhanced Integrated Security Architecture for SDN Infrastructure", NOMS 2020-2020 IEEE/Ifip Network Operations and Management Symposium, IEEE, Apr. 20, 2020 (Apr. 20, 2020), pp. 1-9, XP033777713, D01: 10.1109/NOMS47738.2020.9110405 Sections 1-111.
Nokia Nuage, "Chapter 7—VSS Respond: Dynamic Security Automation", VSS User Guide Release 6.0.5, Mar. 16, 2020.
Mahdi Daghmehchi Firoozjaei et al., "Security challenges with network functions virtualization", Future Generation Computer Systems 67, 2017, pp. 315-324.
Office Action dated Jul. 15, 2024, issued for U.S. Appl. No. 18/695,687 (13 pages).
Adrian Lara et al. "OpenSec: Policy-Based Security Using Software-Defined Networking" IEEE Transactions on Network and Service Management, vol. 13, No. 1, Mar. 2016 (pp. 30-42) (Year: 2016).
Communication under Rule 71(3) EPC dated Feb. 6, 2025, issued for European Application No. 22 773 414.2-1218 (8 pages).
Communication under Rule 71(3) EPC dated Feb. 7, 2025, issued for European Application No. 22 786 289.3-1218 (8 pages).

* cited by examiner

METHODS AND SYSTEMS OF OPERATING SOFTWARE-DEFINED NETWORKS

This application is the U.S. national phase of International Application No. PCT/EP2022/073496 filed Aug. 23, 2022, which designated the U.S. and claims priority to GB Patent Application No. 2113951.4 filed Sep. 29, 2021, the entire contents of each of which are hereby incorporated by reference.

FIELD

The present disclosure relates to software defined networks (SDNs).

More specifically, aspects relate to computer-implemented methods of operating SDNs, data processing systems configured to perform such methods, computer programs comprising instructions which, when the program is executed by a computer, cause the computer to carry out such methods, computer-readable data carriers having such computer programs stored thereon, and data carrier signals carrying such computer programs.

BACKGROUND

FIG. 1 illustrates an example SDN environment 100. Software defined networking is a network management framework which enables dynamic management and control of modern computer networks. SDN aims to logically centralise network control by disassociating the forwarding process of network packets in the data plane 110 from the routing process in the control plane 120. The control plane 120 consists of one or more SDN controllers (SC) 130, which act as the centralised control element of the SDN network, taking all the routing decisions. The data plane 110 consists of physical or virtual network devices, known as data plane elements (DPEs) 140, such as Layer-2 and Layer-3 switches, firewalls, load-balancers, proxies etc. SCs 130 typically use the OpenFlow protocol for communication with DPEs 140 for the purpose of setting up data structures (e.g. switching tables) in order to configure the paths of network packets across the data plane 110. SDN controllers expose their representational state transfer (REST)-based application programming interfaces (APIs) to the upper layer (application plane 150), where network applications and services 160 can use these APIs (the Northbound interface) 170 to manage and monitor the underlying network infrastructure (the data plane 110). (The term 'application' generally denotes a foreground process with which users interact directly, while the term 'service' generally denotes a background process with which users interact indirectly.) During normal operation, an SC 130 takes routing decisions based on the information obtained from an application or service 160 and constructs a path for its network traffic. This is generally done according to a default routing policy, usually using shortest-path algorithms like Open Shortest Path First (OSPF). The SC 130 also sets a static security profile for this network traffic, as specified in the security requirements of the service level agreement (SLA) 180 of the application/service. The SC 130 then pushes the corresponding forwarding and encryption rules to the DPEs 140 using the OpenFlow protocol on the Southbound interface 190.

In existing SDN environments network security is not built into the SDN architecture. Therefore any security measures required to protect connected network resources must be defined and configured before traffic starts flowing. Sometimes security measures need to be upgraded, and/or one or more DPEs 140 isolated, due to security incidents such as attacks on the SDN or particular DPEs 140. Conversely, on other occasions it may be desirable to downgrade security measures or modify paths through the data plane 110, e.g. to improve network performance measures such as latency and/or throughput. In order to make such changes the existing network flows must be terminated and new paths established with any updated security measures applied. This interrupts network traffic, causing delays and disruptions for the applications and services 160 using the SDN 100. The larger and more complex the network topology the greater the delays. What is needed is a way to reduce such delays and disruption.

SUMMARY

According to a first aspect, there is provided a computer-implemented method of operating a software-defined network, the method comprising:
 initialising a plurality of paths through a data plane for traffic associated with a category of applications and/or services;
 selecting one of the plurality of paths to be an initial operational path;
 routing traffic associated with the category of applications and/or services via the initial operational path;
 subsequently obtaining data indicating that a trigger event has occurred; and
 responsive thereto:
  selecting a different one of the plurality of paths to be a replacement operational path; and
  routing traffic associated with the category of applications and/or services via the replacement operational path.

The computer-implemented method can further comprise, following initialising the plurality of paths, periodically refreshing initialisation parameters of a respective one or more data plane elements comprised in each of the plurality of paths such that traffic can be immediately routed via whichever of the plurality of paths is subsequently selected to be the replacement operational path.

Initialising the plurality of paths can comprise:
 defining each of the plurality of paths in a control plane;
 configuring metadata associated with each of the plurality of paths; and
 activating each of the plurality of paths in the data plane.

The metadata can comprise one or more of:
 configuration settings and/or parameters for one or more data plane elements comprised in one or more of the plurality of paths,
 one or more routing rules, and
 a security profile.

The computer-implemented method can further comprise:
 for each of the plurality of paths:
  obtaining specifications of a respective plurality of data plane elements which together form that path; and
  determining, based on the specifications, which one or more of a plurality of security profiles that path is capable of complying with;
 wherein routing traffic via the initial operational path can be performed in compliance with an initial security profile selected from the plurality of security profiles; and
 the computer-implemented method can further comprise, in response to obtaining the data indicating the trigger event has occurred, selecting a different one of the plurality of security profiles to be a replacement security profile; wherein routing traffic via the replacement operational path can be performed in compliance with the replacement security profile.

Selection of the initial security profile can precede selection of the initial operational path, and selecting the initial operational path can comprise selecting one of the plurality of paths that is capable of complying with the initial security profile; and selection of the replacement security profile can precede selection of the replacement operational path, and selecting the replacement operational path can comprise selecting one of the plurality of paths that is capable of complying with the replacement security profile.

The specifications can specify one or more of: security level, compliance standard, key sizes, ciphers, cipher modes and performance indicators.

The data plane elements can comprise one or more switches and/or firewalls and/or load-balancers and/or proxies and/or gateways.

Each security profile can specify a cryptographic primitive to be used for each of confidentiality, integrity, and authentication.

The computer-implemented method can further comprise:
ranking a plurality of cryptographic primitives according to one or more of security, throughput, and latency; and
generating the plurality of security profiles by selecting from the ranked cryptographic primitives.

Generating an $n^{th}$ security profile of the plurality of security profiles can comprise:
selecting an $n^{th}$ ranked confidentiality cryptographic primitive;
selecting an $n^{th}$ ranked integrity cryptographic primitive; and
selecting an $n^{th}$ ranked authentication cryptographic primitive.

The trigger event can be a security alert or an alert that network performance conditions have worsened.

The trigger event can be a security alert, and the replacement security profile can be selected to be more secure than the initial security profile; or
the trigger event can be an alert that network performance conditions have worsened, and the replacement security profile can be selected to be less resource-intensive than the initial security profile.

The category of applications and/or services can be one of: smart grid, tele-surgery, vehicle-to-everything, 'V2X', and defence.

According to a second aspect, there is provided a computer-implemented method of operating a software-defined network, the method comprising:
obtaining specifications of a plurality of data plane elements which together form a path through a data plane suitable for carrying traffic associated with a category of applications and/or services;
determining, based on the specifications, which one or more of a plurality of security profiles the path is capable of complying with;
selecting one of the one or more security profiles to be an initial security profile;
routing traffic associated with the category of applications and/or services via the path in compliance with the initial security profile;
subsequently obtaining data indicating that a trigger event has occurred; and
responsive thereto:
selecting a different one of the plurality of security profiles to be a replacement security profile; and
routing traffic associated with the category of applications and/or services in compliance with the replacement security profile.

The specifications can specify one or more of: security level, compliance standard, key sizes, ciphers, cipher modes and performance indicators.

The data plane elements can comprise one or more switches and/or firewalls and/or load-balancers and/or proxies and/or gateways.

Each security profile can specify a cryptographic primitive to be used for each of confidentiality, integrity, and authentication.

The computer-implemented method can further comprise:
ranking a plurality of cryptographic primitives according to one or more of security, throughput, and latency; and
generating the plurality of security profiles by selecting from the ranked cryptographic primitives.

Generating an $n^{th}$ security profile of the plurality of security profiles can comprise:
selecting an $n^{th}$ ranked confidentiality cryptographic primitive;
selecting an $n^{th}$ ranked integrity cryptographic primitive; and
selecting an $n^{th}$ ranked authentication cryptographic primitive.

The trigger event can be a security alert or an alert that network performance conditions have worsened.

The trigger event can be a security alert, and the replacement security profile can be selected to be more secure than the initial security profile; or
the trigger event can be an alert that network performance conditions have worsened, and the replacement security profile can be selected to be less resource-intensive than the initial security profile.

There can be one or more further paths through the data plane suitable for carrying traffic associated with the category of applications and/or services, and the method can further comprise:
for each of the one or more further paths:
obtaining specifications of a respective further plurality of data plane elements which together form that further path; and
determining, based on those specifications, which of the plurality of security profiles that further path is capable of complying with;
prior to obtaining the data indicating the trigger event has occurred, initialising the one or more further paths; and
responsive to obtaining the data indicating the trigger event has occurred, selecting one of the one or more further paths to be a replacement operational path;
wherein routing traffic associated with the category of applications and/or services in compliance with the replacement security profile can be performed via the replacement operational path.

The computer-implemented method can further comprise, following initialising the one or more further paths, periodically refreshing initialisation parameters of a respective one or more data plane elements comprised in each of the one or more further paths such that traffic can be immediately routed via whichever of the plurality of paths is subsequently selected to be the replacement operational path.

Initialising the one or more further paths can comprise:
defining each of the one or more further paths in a control plane;
configuring metadata associated with each of the one or more further paths; and activating each of the one or more further paths in the data plane.

The metadata can comprise one or more of:
configuration settings and/or parameters for one or more data plane elements comprised in one or more of the one or more further paths,
one or more routing rules, and
a security profile.

The category of applications and/or services can be one of: smart grid, tele-surgery, vehicle-to-everything, 'V2X', and defence.

According to a third aspect, there is provided a data processing system configured to perform the method of either of the first or second aspects.

According to a fourth aspect, there is provided a computer program comprising instructions which, when the program is executed by a computer, cause the computer to carry out the method of either of the first or second aspects.

According to a fifth aspect, there is provided a computer-readable data carrier having stored thereon the computer program of the fourth aspect.

According to a sixth aspect, there is provided a data carrier signal carrying the computer program of the fourth aspect.

BRIEF DESCRIPTION OF THE FIGURES

Aspects of the present disclosure will now be described by way of example with reference to the accompanying figures. In the figures.

DETAILED DESCRIPTION OF THE FIGURES

The following description is presented to enable any person skilled in the art to make and use the system and/or perform the method of the invention, and is provided in the context of a particular application. Various modifications to the disclosed embodiments will be readily apparent to those skilled in the art.

According to one aspect of the present disclosure it is proposed to switch traffic to a redundant pre-established active path in response to a trigger event. According to another aspect of the present disclosure it is proposed to switch to a different security profile (on the same or a different network path) in response to a trigger event, where the possible security profiles are pre-established according to discovery of DPE capabilities (hardware and/or software). (Each security profile could for example specify a particular algorithm to be used for each of confidentiality, integrity and authentication as well as setting relevant parameters such as key size.) These two aspects can be combined to switch traffic to a redundant pre-established active path in response to a trigger event, the choice of redundant path being dependent on the level of security available on that path based on the capabilities of the DPEs forming it. In this way two layers of security and/or efficiency are provided, with minimum traffic disruption.

Figure 1:
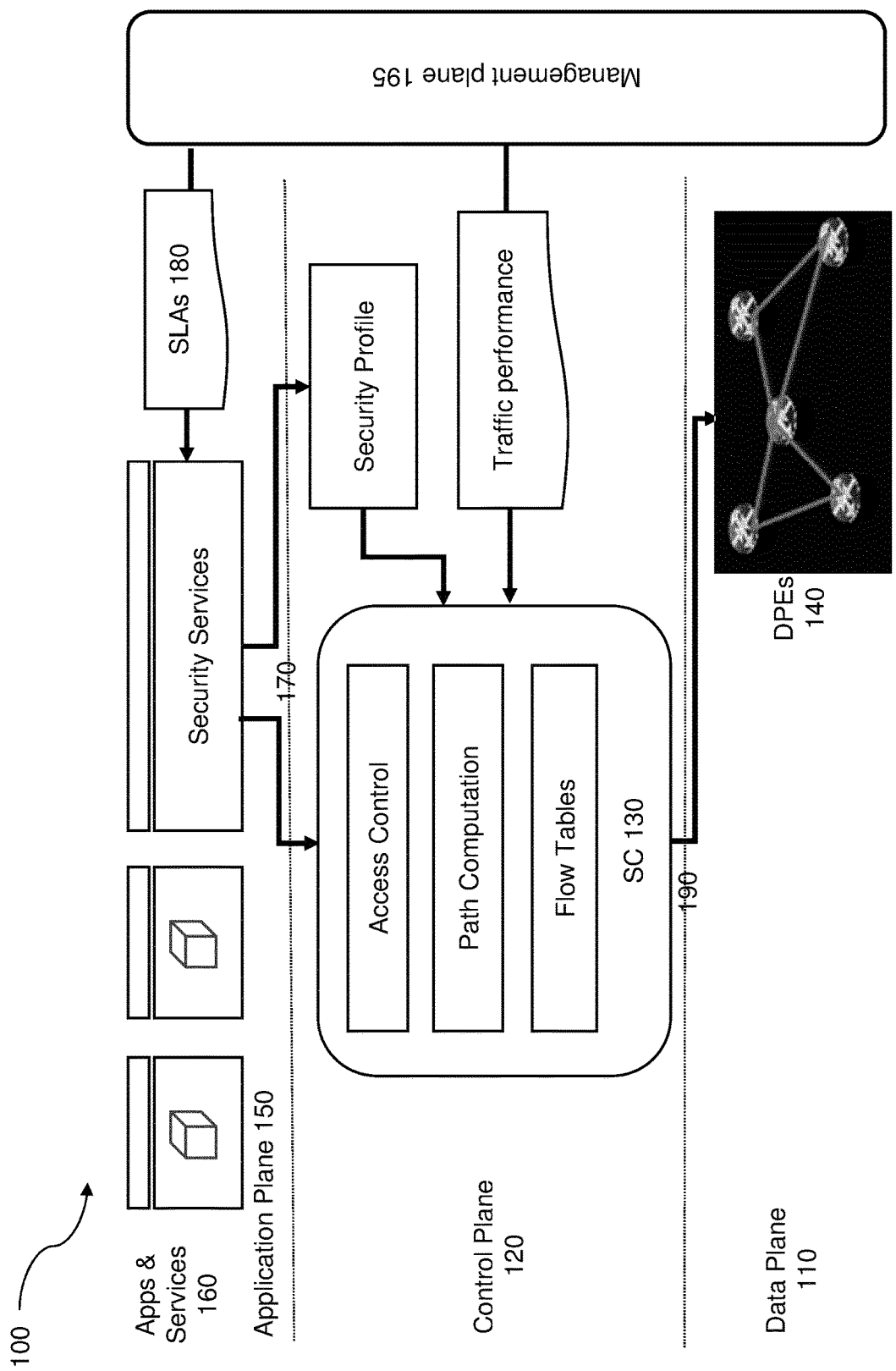
FIG. 1 illustrates an example SDN environment.
Figure 2:
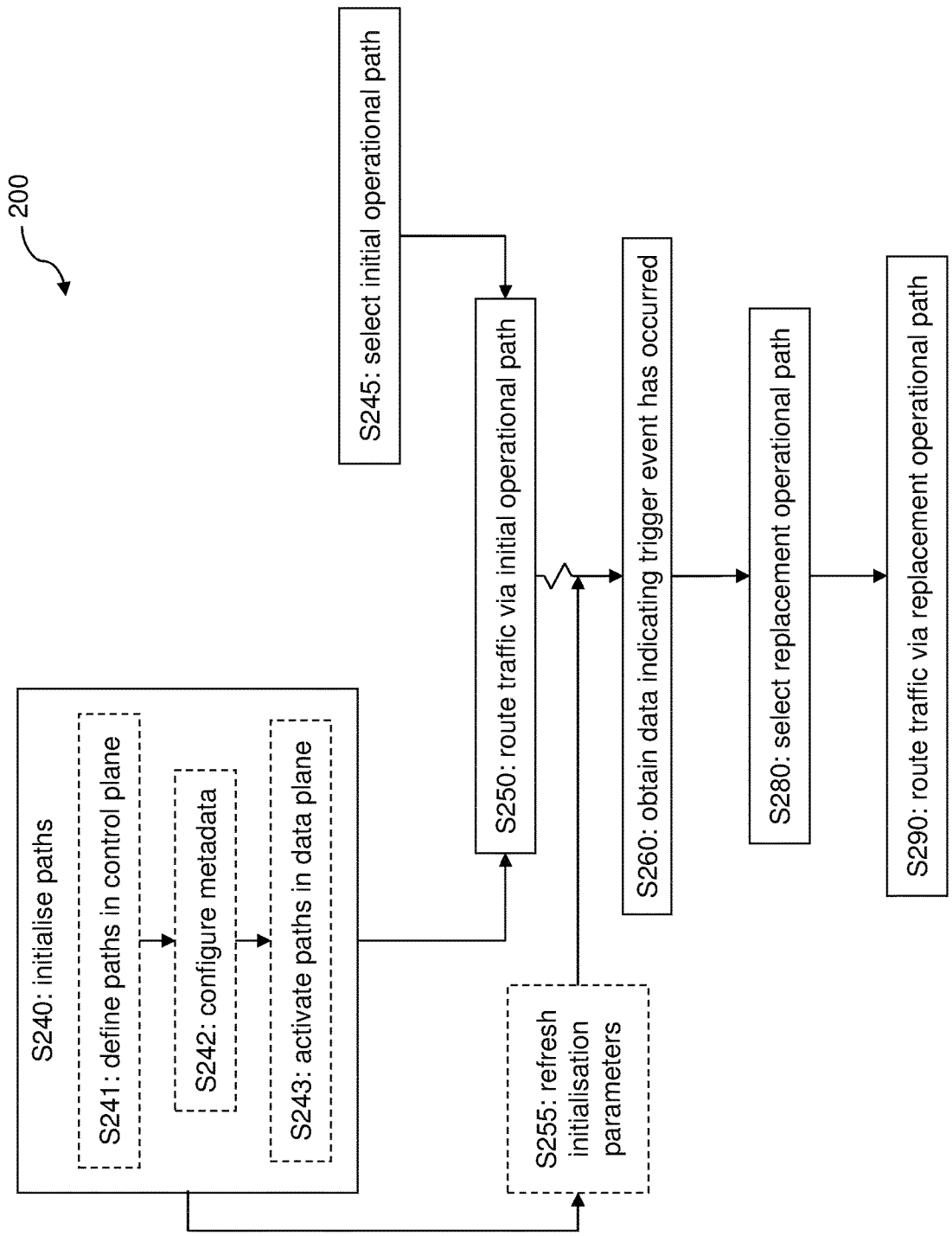
FIG. 2 illustrates a computer-implemented method of operating an SDN according to a first aspect.

FIG. 2 illustrates a computer-implemented method 200 of operating an SDN (such as the SDN 100 of FIG. 1) according to the first aspect, which could for example be performed by an SC 130.

At step S240 a plurality of paths through the data plane 110 are initialised for traffic associated with a category of applications and/or services 160. The category of applications and/or services 160 could for example be one of: smart grid, tele-surgery, vehicle-to-everything (V2X), and defence. The category of applications and/or services 160 could comprise one or a plurality of applications and/or services 160.

Initialising the plurality of paths at step S240 can for example comprise: defining each of the plurality of paths in the control plane 120 at step S241; configuring metadata associated with each of the plurality of paths at step S242; and activating each of the plurality of paths in the data plane 110 at step S243. The metadata configured at step S242 can for example comprise one or more of: configuration settings and/or parameters for one or more DPEs 140 comprised in one or more of the plurality of paths, one or more routing rules, and a security profile. Said DPEs 140 can for example comprise one or more switches and/or firewalls and/or load-balancers and/or proxies and/or gateways.

At step S245 one of the plurality of paths is selected to be an initial operational path. Step S245 can be performed before, after, or partially or wholly contemporaneously with step S240.

Once steps S240 and S245 are complete, traffic associated with the category of applications and/or services 160 is routed via the initial operational path at step S250.

At step S260 data is obtained indicating that a trigger event has occurred. The trigger event can for example be a security alert e.g. relating to a port scanning event, a firewall alert, a distributed denial-of-service (DDOS) attack, more than a predetermined number of invalid login attempts, an intrusion detection system (IDS) alert, malware detection, sensitive data exposure, a security misconfiguration alert, a hardware or software vulnerability alert or a log inspection event. Alternatively, the trigger event can for example be an alert that network performance conditions have worsened, e.g. a decrease in packet throughput, increase in round-trip times or increase in packet jitter. The SC 130 can detect the trigger event through its own monitoring, or it can receive an alert from another entity such as an entity comprised in a management plane 195.

In response to obtaining data indicating that the trigger event has occurred at step S260, at step S280 a different one of the plurality of paths is selected to be a replacement operational path. The replacement operational path could for example exclude one or more DPEs 140 of the initial operational path which are suspected to be compromised, and/or could comprise one or more DPEs 140 newly added to the SDN 100 since the initial operational path was selected.

Once the replacement operational path has been selected at step S280, traffic associated with the category of applications and/or services 160 is routed via it at step S290.

Following initialising the plurality of paths at step S240, initialisation parameters of a respective one or more DPEs 140 comprised in each of the plurality of paths can be refreshed at step S255 such that traffic can be immediately routed via whichever of the plurality of paths is subsequently selected to be the replacement operational path, i.e.

traffic can be routed without any further initialisation, even if there is a long delay between initialisation of the plurality of paths at step S240 and obtaining the data indicating that the trigger event has occurred at step S260.

Figure 3:
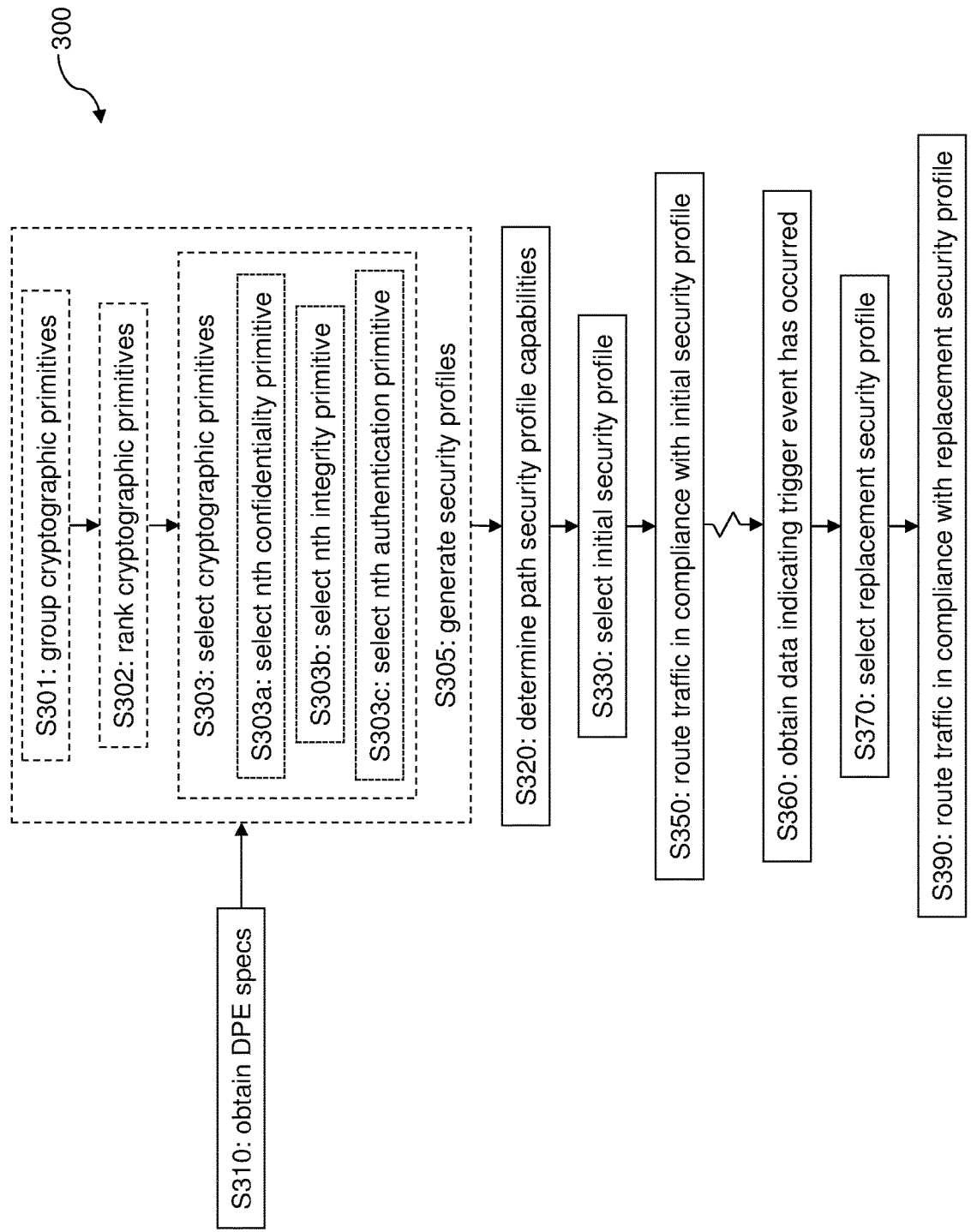
FIG. 3 illustrates a computer-implemented method of operating an SDN according to a second aspect.

FIG. 3 illustrates a computer-implemented method 300 of operating a software-defined network according to the second aspect, which could for example be performed by an SC 130.

At step S310 specifications of a plurality of DPEs 140 which together form a path through the data plane 110 suitable for carrying traffic associated with a category of applications and/or services 160 are obtained. The DPEs 140 can for example comprise one or more switches and/or firewalls and/or load-balancers and/or proxies and/or gateways. The specifications could for example be discovered by the SC 130, e.g. by interrogating the DPEs 140 using the OpenFlow protocol, or provided to it by another entity. The specifications can for example specify hardware and/or software capabilities of the DPEs 140 in respect of one or more of: security level, compliance standard, key sizes, ciphers, cipher modes and performance indicators. The category of applications and/or services 160 could for example be one of: smart grid, tele-surgery, vehicle-to-everything (V2X), and defence. The category of applications and/or services 160 could comprise one or a plurality of applications and/or services 160.

At step S320 it is determined, based on the specifications, which one or more of a plurality of security profiles the path is capable of complying with. One of the one or more security profiles is then selected to be an initial security profile at step S330. Routing of traffic associated with the category of applications and/or services 160 via the path then commences in compliance with the initial security profile at step S350.

At step S360 data is obtained indicating that a trigger event has occurred. The trigger event can for example be a security alert e.g. relating to a port scanning event, a firewall alert, a distributed denial-of-service (DDOS) attack, more than a predetermined number of invalid login attempts, an intrusion detection system (IDS) alert, malware detection, sensitive data exposure, a security misconfiguration alert, a hardware or software vulnerability alert or a log inspection event. Alternatively, the trigger event can for example be an alert that network performance conditions have worsened, e.g. a decrease in packet throughput, increase in round-trip times or increase in packet jitter. The SC 130 can detect the trigger event through its own monitoring or can receive an alert from another entity such as an entity comprised in a management plane 195.

In response to obtaining the data indicating the trigger event has occurred at step S360, a different one of the plurality of security profiles is selected to be a replacement security profile at step S370 before traffic associated with the category of applications and/or services 160 is routed in compliance with the replacement security profile at step S390. If the trigger event is a security alert, then the replacement security profile can be selected at step S370 to be more secure than the initial security profile. Alternatively, if the trigger event is an alert that network performance conditions have worsened, then the replacement security profile can be selected at step S370 to be less resource-intensive than the initial security profile. For example, the replacement security profile could be less computationally demanding than the initial security profile (e.g. using cryptographic primitives having shorter key lengths). As another example, the replacement security profile could comprise cryptographic primitives of types which result in smoother (i.e. less bursty) traffic patterns, reducing maximum instantaneous resource demands on the network. (E.g. the replacement security profile could comprise a stream cipher such as ChaCha or AES-CTR for confidentiality, to replace a block cipher such as 3DES or AES in the initial security profile.) In this way, an appropriate balance can be struck between the level of security applied, performance of the network (in terms of latency, throughput etc.) and resources consumed (electrical energy, bandwidth, memory etc.)

The plurality of security profiles can optionally be generated at step S305 (or they can be obtained in some other way, for example received from another entity). Generating the security profiles at step S305 can for example comprise ranking a plurality of cryptographic primitives at step S302, e.g. according to one or more of security, latency, and throughput. (For example, 3DES uses 64-bit blocks, AES uses 128-bit blocks and ChaCha uses 512-bit blocks. Bigger blocks allow more data to be processed per unit time, increasing throughput.) The plurality of cryptographic primitives can for example be those the DPE specs indicate the DPEs 140 are capable of supporting. The plurality of security profiles can then be generated by selecting from the ranked cryptographic primitives at step S303.

Each security profile could for example specify a cryptographic primitive to be used for each of confidentiality, integrity, and authentication.

Confidentiality algorithms encrypt data (plaintext) such that it becomes unreadable or incomprehensible (ciphertext) by anyone not possessing the correct decryption key.

Integrity algorithms ensure that any alteration or modification of the data protected by them (either plaintext or ciphertext) is easily discernible in case of intended (malicious) changes or unintended changes (caused by errors, e.g. due to noise on a communication channel).

Authentication algorithms verify the authenticity of data by giving a recipient assurance that the data was created by a known sender.

In that case, at step S301 the plurality of cryptographic primitives can be grouped into these three categories. Then ranking of the plurality of cryptographic primitives at step S302 can comprise separately ranking the cryptographic primitives of each category to produce a ranked list of confidentiality primitives, a ranked list of integrity primitives and a ranked list of authentication primitives. Selecting the cryptographic primitives at step S303 can then comprise selecting one from each of the three ranked lists. For example, generating an $n^{th}$ security profile of the plurality of security profiles can comprise: selecting an $n^{th}$ ranked confidentiality cryptographic primitive at step S303a, selecting an $n^{th}$ ranked integrity cryptographic primitive at step S303b, and selecting an $n^{th}$ ranked authentication cryptographic primitive at step S303c. For example, the plurality of security profiles generated could be as shown in Table 1, where the cryptographic primitives have been ranked by security strength so that profile n+1 is more secure than profile n.

TABLE 1

|  | Profile 1 | Profile 2 | Profile 3 | Profile 4 | Profile 5 | Profile 6 |
|---|---|---|---|---|---|---|
| Confidentiality | 3DES | AES-128 | AES-192 | AES-256 | AES-256 | AES-256 |
| Integrity | SHA3-224 | SHA3-256 | SHA3-384 | SHA3-512 | SHA3-512 | SHA3-512 |
| Authentication | RSA-2048 | RSA-3072 | RSA-4096 | ECC-521 | Ed25519 | PQC |

Selection of the initial security profile at step S330 can for example depend on the category of applications and/or services as shown in Table 2.

TABLE 2

| Application/service category | Initial security profile |
|---|---|
| Smart Grid | Profile 2 |
| Tele-surgery | Profile 4 |
| V2X | Profile 1 |
| Defence | Profile 3 |

Selection of the replacement security profile at step S370 could for example be according to a predetermined rule, such as "increase security level by 1". Starting from the initial security profile allocation shown in Table 2, this produces the replacement security profile allocations shown in Table 3.

TABLE 3

| Application/service category | Replacement security profile |
|---|---|
| Smart Grid | Profile 3 |
| Tele-surgery | Profile 5 |
| V2X | Profile 2 |
| Defence | Profile 4 |

Such a rule could for example depend on the trigger event detected. For example, detection of a security event categorised as low threat level could result in the security profile allocations of Table 3, while detection of a security event categorised as high threat level could trigger an "increase security level by 2" rule and detection of a security event categorised as high threat level could result in all application/service categories being allocated the highest security level profile (profile 6 in the scheme of Table 1).

Selection of replacement security profiles could alternatively be bespoke to a particular application/service category, as opposed to according to a predetermined rule. For example, initial and replacement security profiles could be specified in application/service SLAs.

Figure 4:
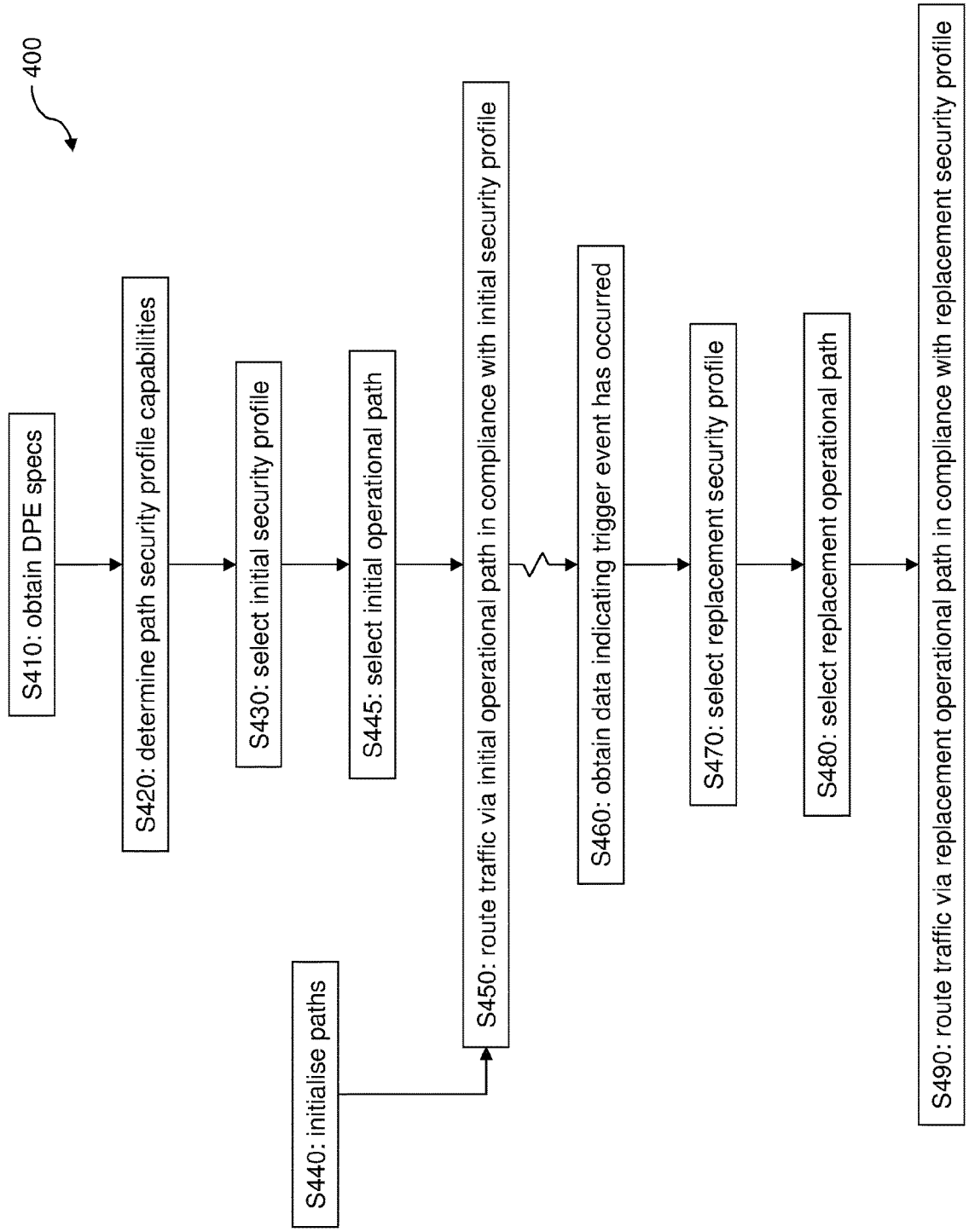
FIG. 4 illustrates a computer-implemented method of operating an SDN according to an example combination of the first and second aspects.

FIG. 4 illustrates a computer-implemented method 400 of operating an SDN according to an example combination of the first and second aspects, which could for example be performed by an SC 130.

At step S410 DPE 140 specifications are obtained, in a similar manner to step S310 of FIG. 3. Security profile capabilities of each of a plurality of paths through the data plane 110 suitable for carrying traffic associated with a category of applications and/or services 160 are then determined at step S420, in a similar manner to step S320 of FIG. 3. An initial security profile is then selected at step S430 in a similar manner to step S330 of FIG. 3.

The plurality of paths are initialised at step S440, in a similar manner to step S240 of FIG. 2.

An initial operational path is selected at step S445, in a similar manner to step S245 of FIG. 2. The initial operational path is selected from those of the plurality of paths capable of complying with the initial security profile selected at step S430. (Alternatively, the initial operational path could be selected first, and the initial security profile subsequently selected from those security profiles that initial operation path is capable of complying with.)

Once all of steps S410, S420, S430, S440 and S445 are complete traffic is routed via the initial operational path in compliance with the initial security profile at step S450.

At step S460 data is obtained indicating that a trigger event has occurred, in a similar manner to step S260 of FIG. 2 and step S360 of FIG. 3.

In response to obtaining the data indicating the trigger event has occurred at step S460, a replacement security profile is selected at step S470, in a similar manner to step S370 of FIG. 3.

Also in response to obtaining the data indicating the trigger event has occurred at step S460, a replacement operational path is selected at step S480, in a similar manner to step S280 of FIG. 2. The replacement operational path is selected from those of the plurality of paths capable of complying with the replacement security profile. (Alternatively, the replacement operational path could be selected first, and the replacement security profile subsequently selected from those security profiles that replacement operation path is capable of complying with.)

Finally, traffic is routed via the replacement operational path in compliance with the replacement security profile at step S490.

Figure 5:
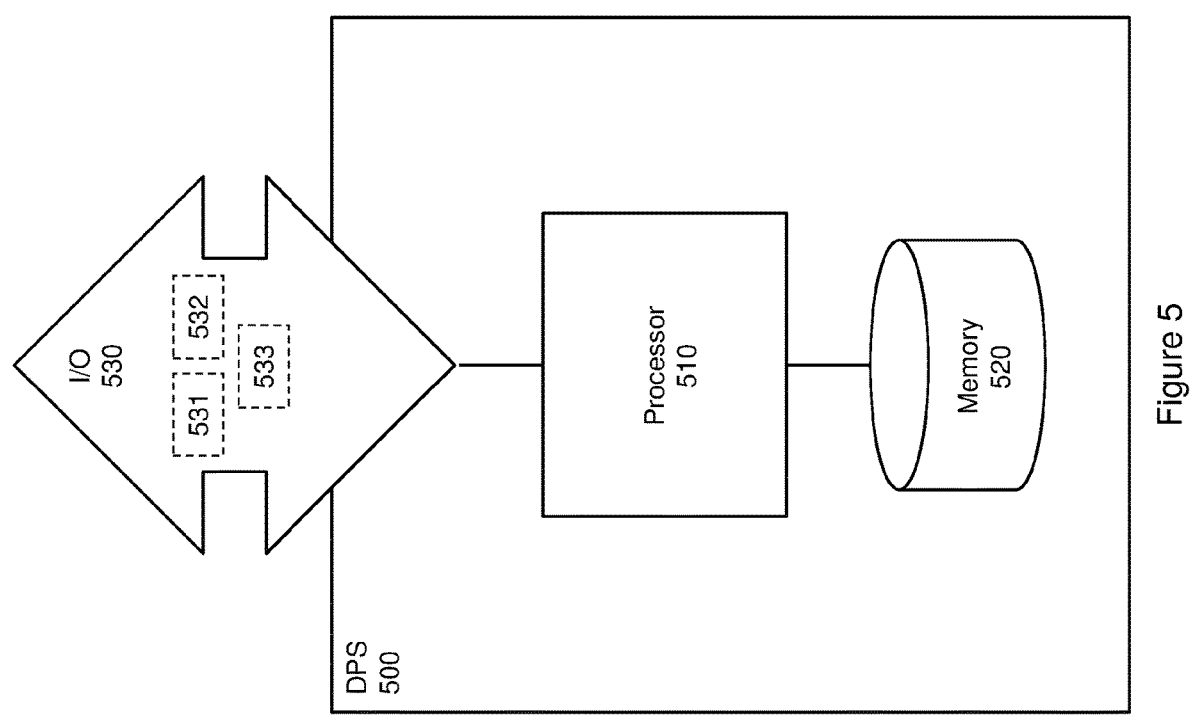
FIG. 5 schematically illustrates an example data processing system capable of performing any of the methods of FIG. 2, 3 or 4.

FIG. 5 schematically illustrates an example data processing system (DPS) 500 capable of performing any of the methods 200, 300, 400. It comprises a processor 510 operably coupled to both a memory 520 and an interface (I/O) 530.

The memory 520 can optionally comprise computer program instructions which, when the program is executed by the processor 510, cause the data processing system 500 to carry out any of the methods 200, 300, 400. Alternatively or additionally, the interface 530 can optionally comprise one or both of a physical interface 531 configured to receive a data carrier having such instructions stored thereon and a receiver 532 configured to receive a data carrier signal carrying such instructions.

The interface 530 comprises a receiver 532 configured to receive messages. The receiver 532 can comprise one or more wireless receiver modules and/or one or more wired receiver modules. The interface 530 further comprises a transmitter 533 configured to transmit messages. The transmitter 533 can comprise one or more wireless transmitter modules and/or one or more wired transmitter modules.

Embodiments of the invention will be apparent to those skilled in the art from consideration of the specification. It is intended that the specification be considered as exemplary only.

Where this application lists one or more method steps, the presence of precursor, follow-on and intervening method steps is not excluded unless such exclusion is explicitly indicated. Similarly, where this application lists one or more components of a device or system, the presence of additional components, whether separate or intervening, is not excluded unless such exclusion is explicitly indicated.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The scope of the present invention includes any novel features or combination of features disclosed herein. The applicant hereby gives notice that new claims may be formulated to such features or combination of features during prosecution of this application or of any further applications derived therefrom. In particular, with reference to the appended claims, features from dependent claims may be combined with those of the independent claims and features from respective independent claims may be combined in any appropriate manner and not merely in the specific combinations enumerated in the claims.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus, or system to implement the foregoing described methods is envisaged as an aspect of the present invention. Such a computer program may be embodied as source code or undergo compilation for implementation on a processing device, apparatus or system or may be embodied as object code, for example.

Such a computer program may be encoded as executable instructions embodied in a carrier medium, non-transitory computer-readable storage device and/or a memory device in machine or device readable form, for example in volatile memory, non-volatile memory, solid-state memory, magnetic memory such as disk or tape, optically or magneto-optically readable memory such as magnetic tape, compact disk (CD), digital versatile disk (DVD) or other media that are capable of storing code and/or data. Such a computer program may alternatively or additionally be supplied from a remote source embodied in a communications medium such as an electronic signal, radio frequency carrier wave or optical carrier wave. Such carrier media are also envisaged as aspects of the present invention.

Such instructions, when executed by a processor (or one or more computers, processors, and/or other devices) may cause the processor (the one or more computers, processors, and/or other devices) to perform at least a portion of the methods described herein.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, smartphones, tablets, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

The invention claimed is:

1. A computer-implemented method of operating a software-defined network, the method comprising:
ranking a plurality of cryptographic primitives according to one or more of security, throughput, and latency;
generating a plurality of security profiles by selecting from the ranked cryptographic primitives;
for each of a plurality of paths through a data plane:
obtaining specifications of a respective plurality of data plane elements which together form that path; and
determining, based on the specifications, which one or more of the plurality of security profiles that path is capable of complying with;
the method further comprising:
initialising the plurality of paths for traffic associated with a category of applications and/or services;
selecting one of the plurality of paths to be an initial operational path;
routing traffic associated with the category of applications and/or services via the initial operational path in compliance with an initial security profile selected from the plurality of security profiles;
subsequently obtaining data indicating that a trigger event has occurred; and, responsive thereto:
selecting a different one of the plurality of paths to be a replacement operational path;
selecting a different one of the plurality of security profiles to be a replacement security profile; and
routing traffic associated with the category of applications and/or services via the replacement operational path in compliance with the replacement security profile.

2. The computer-implemented method of claim 1, wherein initialising the plurality of paths comprises:
defining each of the plurality of paths in a control plane;
configuring metadata associated with each of the plurality of paths; and
activating each of the plurality of paths in the data plane.

3. The computer-implemented method of claim 2, wherein the metadata comprises one or more of:
configuration settings and/or parameters for one or more data plane elements comprised in one or more of the plurality of paths,
one or more routing rules, and
a security profile.

4. The computer-implemented method of claim 1, wherein:
selection of the initial security profile precedes selection of the initial operational path, selecting the initial operational path comprising selecting one of the plurality of paths that is capable of complying with the initial security profile; and
selection of the replacement security profile precedes selection of the replacement operational path, selecting the replacement operational path comprising selecting one of the plurality of paths that is capable of complying with the replacement security profile.

5. The computer-implemented method of claim 1, wherein the specifications specify one or more of: security level, compliance standard, key sizes, ciphers, cipher modes and performance indicators.

6. The computer-implemented method of claim 1, wherein the data plane elements comprise one or more switches and/or firewalls and/or load-balancers and/or proxies and/or gateways.

7. The computer-implemented method of claim 1, wherein each security profile specifies a cryptographic primitive to be used for each of confidentiality, integrity, and authentication.

8. The computer-implemented method of claim 1, wherein generating an $n^{th}$ security profile of the plurality of security profiles comprises:
selecting an $n^{th}$ ranked confidentiality cryptographic primitive;
selecting an $n^{th}$ ranked integrity cryptographic primitive; and
selecting an $n^{th}$ ranked authentication cryptographic primitive.

9. The computer-implemented method of claim 1, wherein the trigger event is a security alert or an alert that network performance conditions have worsened.

10. The computer-implemented method of claim 9, wherein:
the trigger event is a security alert, and the replacement security profile is selected to be more secure than the initial security profile; or
the trigger event is an alert that network performance conditions have worsened, and the replacement security profile is selected to be less resource-intensive than the initial security profile.

11. The computer-implemented method of claim 1, wherein the category of applications and/or services is one of: smart grid, tele-surgery, vehicle-to-everything, 'V2X', and defence.

12. A computer-implemented method of operating a software-defined network, the method comprising:
initialising a plurality of paths through a data plane for traffic associated with a category of applications and/or services to establish a plurality of active paths;
selecting one of the plurality of active paths to be an initial operational path such that the other one or more paths of the plurality are redundant pre-established active paths;
routing traffic associated with the category of applications and/or services via the initial operational path;
subsequently obtaining data indicating that a trigger event has occurred; and
responsive thereto;
selecting one of the one or more redundant pre-established active paths to be a replacement operational path; and
routing traffic associated with the category of applications and/or services via the replacement operational path;
the computer-implemented method further comprising, following initialising the plurality of paths, periodically refreshing initialisation parameters of a respective one or more data plane elements comprised in each of the plurality of paths such that traffic can be immediately routed via whichever of the plurality of paths is subsequently selected to be the replacement operational path;
the computer-implemented method further comprising, for each of the plurality of paths;
obtaining specifications of a respective plurality of data plane elements which together form that path; and
determining, based on the specifications, which one or more of a plurality of security profiles that path is capable of complying with;
wherein routing traffic via the initial operational path is performed in compliance with an initial security profile selected from the plurality of security profiles;
the computer-implemented method further comprising, in response to the obtaining of the data indicating the trigger event having occurred, selecting a different one of the plurality of security profiles to be a replacement security profile;
wherein routing traffic via the replacement operational path is performed in compliance with the replacement security profile; and
the computer-implemented method further comprising:
ranking a plurality of cryptographic primitives according to one or more of security, throughput, and latency; and
generating the plurality of security profiles by selecting from the ranked cryptographic primitives.

13. A data processing system for operating a software-defined network, the data processing system comprising: a processor and a storage memory storing a computer program comprising instructions which, when the program is executed by the processor, cause the data processing system to at least be configured to:
rank a plurality of cryptographic primitives according to one or more of security, throughput, and latency;
generate a plurality of security profiles by selecting from the ranked cryptographic primitives;
for each of a plurality of paths through a data plane;
obtain specifications of a respective plurality of data plane elements which together form that path; and
determine, based on the specifications, which one or more of the plurality of security profiles that path is capable of complying with;
the data processing system is further configured to:
initialize the plurality of paths for traffic associated with a category of applications and/or services;
select one of the plurality of paths to be an initial operational path;
route traffic associated with the category of applications and/or services via the initial operational path in compliance with an initial security profile selected from the plurality of security profiles;

subsequently obtain data indicating that a trigger event has occurred; and, responsive thereto;
- select a different one of the plurality of paths to be a replacement operational path;
- select a different one of the plurality of security profiles to be a replacement security profile; and
- route traffic associated with the category of applications and/or services via the replacement operational path in compliance with the replacement security profile.

14. A non-transitory computer-readable storage medium storing a computer program comprising instructions which, when the program is executed by a computer, cause the computer to carry out the method of claim 1.

15. A non-transitory computer-readable storage medium storing a computer program comprising instructions which, when the program is executed by a computer, cause the computer to carry out the method of claim 12.

16. A data processing system for operating a software-defined network the data processing system comprising: a processor and a storage memory storing a computer program comprising instructions which, when the program is executed by the processor, cause the data processing system to at least be configured to:
- initialize a plurality of paths through a data plane for traffic associated with a category of applications and/or services to establish a plurality of active paths;
- select one of the plurality of active paths to be an initial operational path such that the other one or more paths of the plurality are redundant pre-established active paths;
- route traffic associated with the category of applications and/or services via the initial operational path;
- subsequently obtain data indicating that a trigger event has occurred; and responsive thereto:
- select one of the one or more redundant pre-established active paths to be a replacement operational path; and
- route traffic associated with the category of applications and/or services via the replacement operational path;
- the data processing system is further configured to, following initialization of the plurality of paths, periodically refresh initialisation parameters of a respective one or more data plane elements comprised in each of the plurality of paths such that traffic can be immediately routed via whichever of the plurality of paths is subsequently selected to be the replacement operational path;
- the data processing system is further configured to, for each of the plurality of paths:
  - obtain specifications of a respective plurality of data plane elements which together form that path; and
  - determine, based on the specifications, which one or more of a plurality of security profiles that path is capable of complying with;
- wherein routing traffic via the initial operational path is performed in compliance with an initial security profile selected from the plurality of security profiles;
- the data processing system is further configured to, in response to the obtaining of the data indicating the trigger event having occurred, select a different one of the plurality of security profiles to be a replacement security profile;
- wherein routing traffic via the replacement operational path is performed in compliance with the replacement security profile; and
- the data processing system is further configured to:
  - rank a plurality of cryptographic primitives according to one or more of security, throughput, and latency; and
  - generate the plurality of security profiles by selecting from the ranked cryptographic primitives.

* * * * *